(12) United States Patent
Chambers et al.

(10) Patent No.: US 7,570,978 B2
(45) Date of Patent: Aug. 4, 2009

(54) APPARATUS AND METHOD FOR PREVENTING AN UNINTENTIONAL ACTIVATION OF A MOBILE COMMUNICATION DEVICE

(75) Inventors: Michael J. Chambers, Erlangen (DE); Michael Kiessling, Freising (DE)

(73) Assignee: Agere Systems Inc., Allentown, PA (US)

( * ) Notice: Subject to any disclaimer, the term of this patent is extended or adjusted under 35 U.S.C. 154(b) by 344 days.

(21) Appl. No.: 11/291,937

(22) Filed: Dec. 1, 2005

(65) Prior Publication Data

US 2007/0129121 A1   Jun. 7, 2007

(51) Int. Cl.
*H04M 1/00* (2006.01)
*H04B 1/38* (2006.01)
*H04M 9/00* (2006.01)

(52) U.S. Cl. ............... 455/575.4; 455/566; 455/575.1; 455/575.8; 379/433.02; 379/433.11; 379/433.12

(58) Field of Classification Search ............... 455/90.3, 455/90.2, 550.1, 556.1, 572, 575.1, 575.4, 455/575.7, 162.1, 163.1, 66.1, 565, 566, 455/574, 575.8; 379/433.12, 426, 427, 433.01, 379/433.02, 433.04, 433.06, 433.09, 433.11, 379/433.13

See application file for complete search history.

(56) References Cited

U.S. PATENT DOCUMENTS

| | | | | |
|---|---|---|---|---|
| 5,241,583 | A * | 8/1993 | Martensson | 455/565 |
| 6,782,242 | B1 * | 8/2004 | Koleda et al. | 455/90.3 |
| 6,980,840 | B2 * | 12/2005 | Kim et al. | 455/575.4 |
| 7,257,432 | B2 * | 8/2007 | Nan | 455/575.4 |
| 2003/0003962 | A1 * | 1/2003 | Vooi-Kia et al. | 455/566 |
| 2005/0064921 | A1 * | 3/2005 | Jeong et al. | 455/575.4 |
| 2005/0079898 | A1 * | 4/2005 | Park | 455/575.1 |
| 2005/0119034 | A1 * | 6/2005 | Kato et al. | 455/575.4 |
| 2005/0272487 | A1 * | 12/2005 | Lee | 455/575.4 |
| 2005/0288055 | A1 * | 12/2005 | Lubowicki et al. | 455/550.1 |
| 2005/0288076 | A1 * | 12/2005 | Seol | 455/575.4 |
| 2006/0068859 | A1 * | 3/2006 | Lee et al. | 455/575.4 |
| 2006/0128449 | A1 * | 6/2006 | Park | 455/575.4 |
| 2006/0287012 | A1 * | 12/2006 | Lan | 455/575.1 |

FOREIGN PATENT DOCUMENTS

| | | |
|---|---|---|
| EP | 1150476 A2 | 10/2001 |
| EP | 1307030 A2 | 5/2003 |
| EP | 1513323 A1 | 3/2005 |
| EP | 1519544 A2 | 3/2005 |
| JP | 2003046618 A * | 2/2003 |
| JP | 02003046618 * | 4/2003 |

* cited by examiner

*Primary Examiner*—Nay A Maung
*Assistant Examiner*—Paul P Tran

(57) ABSTRACT

A mobile communication device and a method of operating the same to prevent unintentional activation thereof. In one embodiment, the mobile communication device includes: (1) a first body part, (2) a second body part, (3) a slider mechanism configured to slidably attach the second body part to the first body part, the second body part movable at least from a first position to a second position with respect to the first body part by means of the slider mechanism and (4) a lock configured to lock the second body part in the first position.

15 Claims, 3 Drawing Sheets

APPARATUS AND METHOD FOR PREVENTING AN UNINTENTIONAL ACTIVATION OF A MOBILE COMMUNICATION DEVICE

TECHNICAL FIELD OF THE INVENTION

The present invention is directed, in general, to mobile communication devices and, more particularly, to an apparatus and method for locking mobile communication devices to prevent unintentional activation.

BACKGROUND OF THE INVENTION

A constant trend in the mobile communication market is the ongoing development towards miniaturization. However, operability requires certain minimum sizes for components with which a user must interact, such as its keypad or display. Therefore, certain designs of mobile communication devices include folding or sliding mechanisms. These designs allow smaller sizes when the device is not in operation and can also provide an additional protection for keypad and display.

For example, U.K. Patent Application GB2235606A is directed to a portable telephone provided with an extending sleeve-like portion mounted for longitudinal slidable movement between a retracted position when not in use and an extended position for use. The extending portion can be adapted to conceal selected keys of a keypad in the retracted position to prevent accidental actuation of the these keys. U.K. Patent Application GB2235606A is directed to a retaining structure for holding the extending portion in the retracted position. When a release button is pressed, the extending portion is automatically moved to the extended position under the action of a spring.

U.K. patent application GB2235606 is directed to a release mechanism. Unfortunately, its design is such that it is vulnerable to opening by itself, for example when being carried in a rucksack together with other things. Other slider mechanisms adapted for manually performing the sliding movement, have the same problem.

This is not a minor problem, because when an electronic device is activated, its power consumption increases. For example, when a portable telephone is activated, its backlight typically turns on, resulting in a dramatically increased power consumption. Since the sliding mechanism typically is adapted to conceal the keypad or parts thereof, unintentional opening of the slider mechanism can also result in unintentional depressing of keys and unintended activation of functions. Unwanted calls to emergency response numbers may even result.

U.S. Pat. No. 5,241,583 is directed to a portable radio telephone provided with an electronic keypad lock function for disabling the keys to prevent accidental actuation. The keypad is disabled and enabled by performing a predetermined order of keystrokes. The patent also discloses a variation in which the keypad automatically unlocks upon detecting an incoming call.

Disabling the keypad, however, does not solve the problem of increased power consumption due to a backlight switched on by an accidentally opening slider mechanism. What is needed in the art is a fundamentally new way to lock mobile communication devices to prevent unintentional activation.

SUMMARY OF THE INVENTION

To address the above-discussed deficiencies of the prior art, the present invention provides, in one aspect, a mobile communication device. In one embodiment, the mobile communication device includes: (1) a first body part, (2) a second body part, (3) a slider mechanism configured to slidably attach the second body part to the first body part, the second body part movable at least from a first position to a second position with respect to the first body part by means of the slider mechanism and (4) a lock configured to lock the second body part in the first position.

In another aspect, the present invention provides a method of controlling a lock of a mobile communication device having a first body part, a second body part, and a slider mechanism configured to slidably attaching the second body part to the first body part, the second body part movable at least from a first position to a second position with respect to the first body part by means of the slider mechanism, the lock configured to lock the second body part in the first position. In one embodiment, the method includes: (1) detecting an incoming call and (2) disabling the lock in response to a detected incoming call.

The foregoing has outlined preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1A:
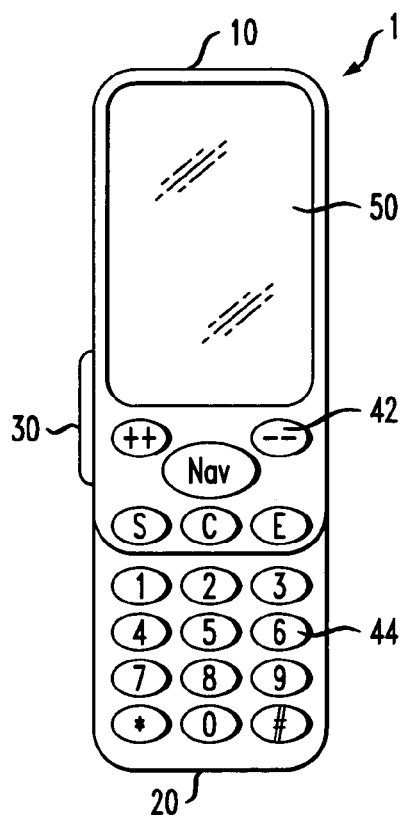
FIG. 1A illustrates a schematic front view of a first embodiment of a mobile communication device constructed in accordance with the principles of the present invention and having a mechanical lock and a second body part in an extended position.

Described herein is one aspect of the present invention that takes the form of a mobile communication device, in particular a mobile telephone, a personal digital assistant (PDA) or a multimedia digital assistant (MDA). In one embodiment, the mobile communication device includes a first body part, a second body part, a slider mechanism for slidably attaching the second body part to the first body part and the lock for locking the second body part in the first position. The second body part is movable at least from a first position to a second position with respect to the first body part by means of the slider mechanism.

In one embodiment, the first position is a retracted position resulting in smaller device dimensions compared to the second position. In the retracted position, a display or keypad or parts thereof are concealed for protection or for preventing unintentional actuation. In this embodiment, the second position is an extended position allowing full use of the keypad and the display.

For practical purposes the locking mechanism advantageously includes a stop for blocking the slider mechanism. However, depending on the design of the slider mechanism also any other suitable kind of stop can be provided. The lock may further include a spring mechanism, for instance for exerting force on the stop.

In a first embodiment described below in conjunction with FIGS. 1A, 1B, 2A and 2B, the lock is a mechanical lock including a user-operable mechanical switch. The user-operable mechanical switch may be a micro-slider switch. The user-operable mechanical switch is arranged on the side of the mobile communication device for single-hand operation.

For preventing unintentional operation, the user-operable mechanical switch may be configured to be operated only by application of a given minimum force provided by, for example, a sufficiently high frictional resistance as the switch is moved by the user.

In order to enable alternative operation with the right or left hand of a user, the user-operable mechanical switch may include at least two operating elements. For practical purposes, these elements may be arranged on opposite sides of the device.

In a second embodiment described below in conjunction with FIGS. 3 and 4, the lock is an electromechanical lock that includes an electric motor and a controller for controlling the electric motor. In the second embodiment, the lock can include a stop for blocking the slider mechanism. In this embodiment, however, the stop is advantageously coupled with the electric motor, thus enabling automatic movement of the stop controlled by the controller.

The lock may be manually operable by user input via a keypad of the mobile communication device. In such case, part of the keypad may remain exposed when the second body part is in the first position. Alternatively, an additional button for engaging the lock may be provided.

In one embodiment, the controller is configured to detect an incoming call and automatically disable the lock in response to a detected incoming call. Thereby the second body part can be slid from the first position into the second position without any further ado in case of an incoming call.

The inventive mobile communication device may be further provided with a keypad lock. Accordingly, the controller advantageously is configured to disable at least part of the keys of the keypad. The controller may be further configured to automatically interrupt disablement of the keypad in response to detecting the incoming call.

The lock for blocking the slider mechanism may be associated with the keypad lock. In such case, software in the mobile communication device may implement a the keypad lock function. Locking the slider mechanism together with the keypad with advantage can be selected in a menu of a Man-Machine Interface (MMI) of the mobile communication device, thereby enabling single hand operation.

The mobile communication device may be configured both to disable the lock of the slider mechanism and interrupt disablement of the keys of the keypad when an incoming call is detected.

Described herein is another aspect of the present invention that takes the form of a method for controlling the lock of a mobile communication device. As above, the mobile communication device has a first body part, a second body part a slider mechanism for slidably attaching the second body part to the first body part and a lock configured to lock the second body part in the first position. The second body part is movable at least from a first position to a second position with respect to the first body part by means of the slider mechanism. The method includes detecting an incoming call and disabling the lock in response to the detected incoming call.

The mobile communication device may be provided with a user-activatable function for disabling at least part of the keys of the keypad, in which case the method further includes interrupting key disablement in response to the detected incoming call.

A mobile communication device that already is provided with a keypad lock software configured to disable the keypad lock upon sensing an incoming call can be adapted to conform to the principles of the present invention by coupling the keypad lock software with an embodiment of the lock and slider mechanism described herein.

The method described above may be carried out by software stored in a digital storage medium, e.g., a chip, and executed in a processor, e.g., a microprocessor. Of course, the method may alternatively be carried out in dedicated hardware.

Referring initially to FIG. 1A, illustrated is a schematic front view of a first embodiment of a mobile communication device constructed in accordance with the principles of the present invention and having a mechanical lock and a second body part in an extended position. In FIG. 1A, the mobile communication device is a mobile telephone 1. The mobile telephone 1 is provided with a first body part 10 and a second body part 20, which are slidably attached to one another. The mobile telephone 1 is further provided with a display 50 and a keypad including a first portion 42 and a second portion 44. A mechanical micro-slider switch 30, located at a side of the mobile telephone 1, blocks a slider mechanism (not shown in FIG. 1A, but referenced in FIG. 1B as 54) by which the first and second body parts 10 and 20 are attached to one another. In FIG. 1A the second body part 20 is in an extended position with respect to the first body part 10. A side view is given in FIG. 1B.

Figure 1B:
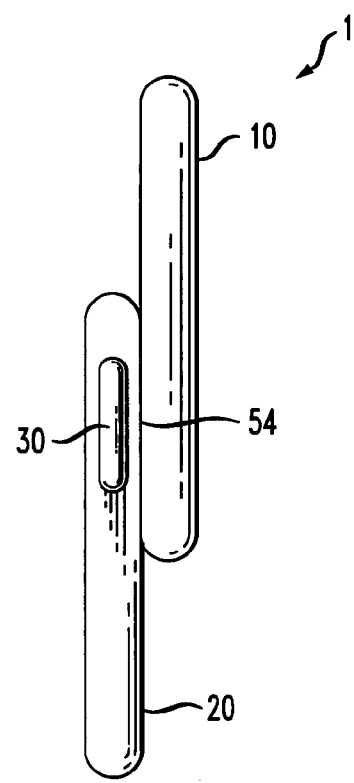
FIG. 1B illustrates a schematic side view of the device of FIG. 1A.
Figure 2A:
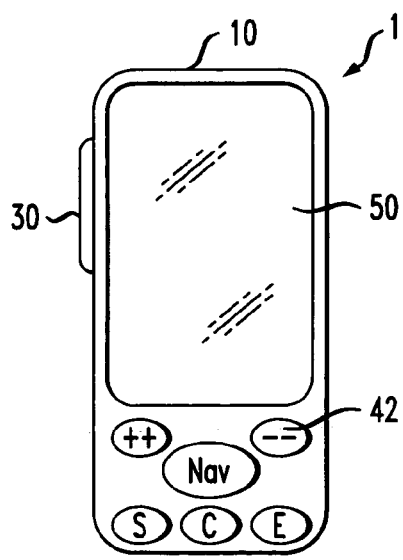
FIG. 2A illustrates a schematic front view of the device of FIG. 1A with its second body part in a retracted position.
Figure 2B:
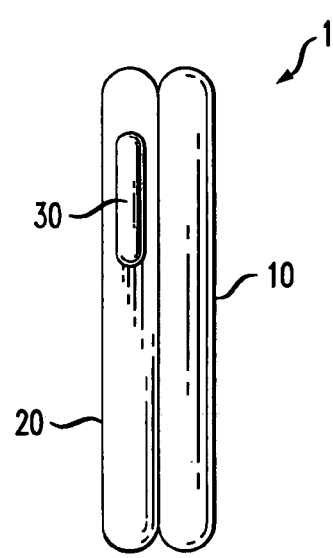
FIG. 2B illustrates a schematic side view of the device of FIG. 2A.

Turning now to FIG. 2A, illustrated is the mobile telephone 1 of FIGS. 1A and 1B with the second body part 20 in a retracted position with respect to the first body part 10. In FIG. 2A, it is evident that a portion 44 of the keypad is concealed when the second body part is in the retracted position, thereby protecting this part of the keypad against external influences. A portion 42 of the keypad, though, is still accessible by the user for activating certain functions of the mobile telephone 1. FIG. 2B shows a side view of the retracted position.

FIGS. 3 to 6 show alternative embodiments of an inventive mobile communication device that differ in the design of the lock for locking the first and second body parts 10 and 20 in a given position with respect to each other. Shown are only schematic inside views, since the outward appearance of the different embodiments is substantially identical to the first embodiment shown in FIG. 1A, 1B, 2A and 2B.

Figure 3:
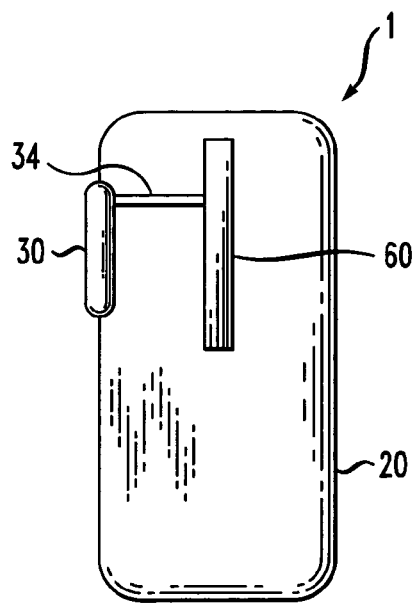
FIG. 3 illustrates a schematic inside view of the second body part of the device of FIG. 1A.

FIG. 3 shows a schematic inside view of the second body part 20 of the mobile telephone 1. In the embodiment of FIG. 3, the lock for blocking the slider mechanism includes a micro-slider switch 30, to which a lever 34 with a spring mechanism is coupled. By manually moving the micro-slider switch 30 in a longitudinal direction parallel to the main axis of mobile telephone 1, the lever 34 is moved to either block or liberate the slider rail 60 (not shown in FIG. 3), by which the second body part 20 is attached to the first body part 10.

Figure 4:
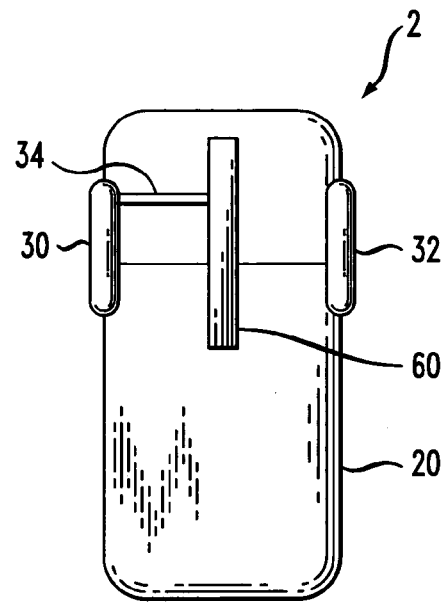
FIG. 4 illustrates a schematic inside view of the second body part of a second embodiment of a mobile communication device constructed in accordance with the principles of the present invention.

FIG. 4 shows mobile telephone 2, which is provided with two interconnected micro-slider switches 30 and 32 for operating lever 34. This embodiment is particularly advantageous if it is desired to allow usage with either the left or the right hand of the user.

Figure 5:
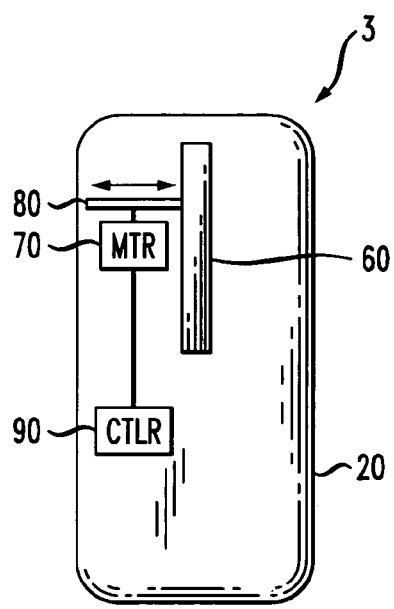
FIG. 5 illustrates a schematic inside view of the second body part of a third embodiment of a mobile communication device constructed in accordance with the principles of the present invention and having an electromechanical lock.

FIG. 5 shows a schematic inside view of the second body part 20 of the mobile telephone 3, which is provided with an electro-mechanical lock for locking the slider mechanism. In the embodiment of FIG. 5, the mobile telephone 3 is also provided with a keypad lock software for at least partially disabling the keys of a keypad. The keypad lock software controls via controller 90 a small electrical motor 70 which is coupled to a stop 80. The motor 70 moves the stop 80 to block the slider rail 60 if the slider mechanism is closed, i.e., the second body part is in the retracted position.

Figure 6:
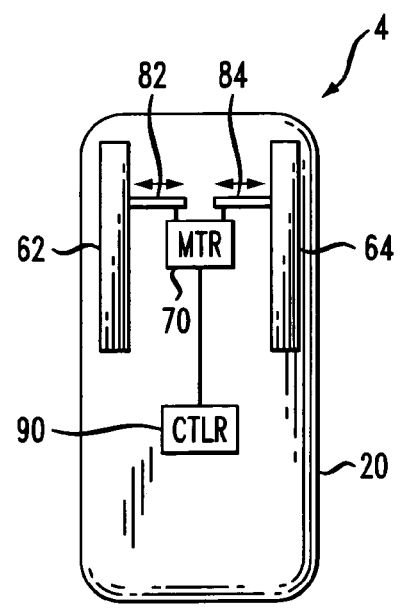
FIG. 6 illustrates a schematic inside view of the second body part of a fourth embodiment of a mobile communication device constructed in accordance with the principles of the present invention and having an electromechanical lock and a slider mechanism including two slider rails.

FIG. 6 shows a further embodiment, in which the mobile telephone 4 is provided with two slider rails 62, 64 for attaching the second body part 20 to the first body part 10. The electric motor 70 in this embodiment moves two stops 82, 84 for blocking both slider rails 62, 64. Similar to the embodiment shown in FIG. 5, the electrical motor 70 is controlled via the controller 90 by a keypad lock software implemented in the mobile telephone 4. In case of an incoming call the keypad lock is removed and the slider rails 62, 64 are liberated so that the slider mechanism can be operated without any further procedure.

Figure 7:
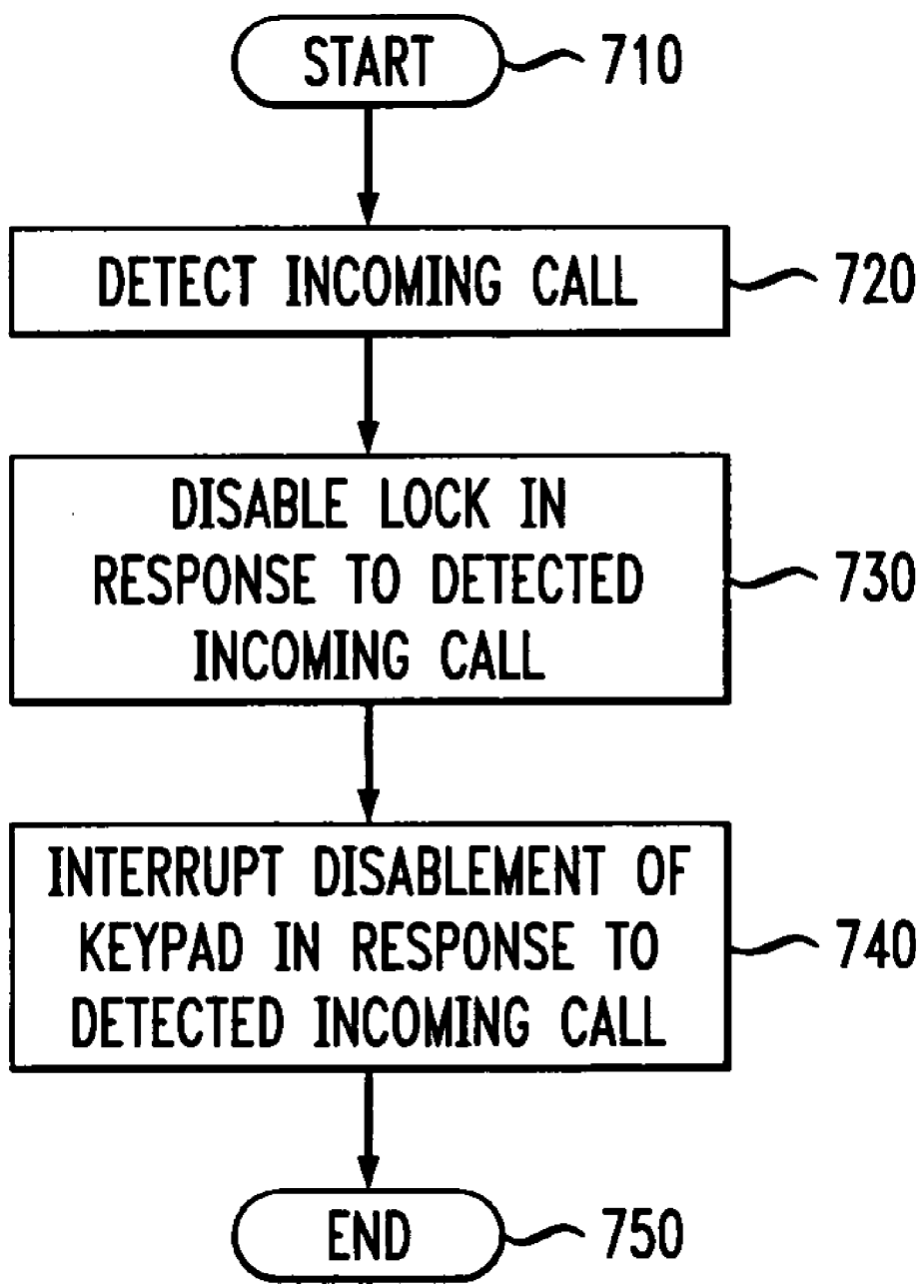
FIG. 7 illustrates a flow diagram of one embodiment of a method of automatically unlocking a mobile communication device carried out according to the principles of the present invention.

Turning now to FIG. 7, illustrated is a flow diagram of one embodiment of a method of automatically unlocking a mobile communication device carried out according to the principles of the present invention. The method begins in a start step 710, wherein the mobile communication device is locked. In a step 720, the mobile communication device detects an incoming call. In a step 730, the lock is automatically disabled in response to the detected incoming call, liberating the slider mechanism to allow the user to place the mobile communication device in the extended position. In a step 740, any disablement of the keypad is interrupted in response to the detected incoming call, leaving the keypad activated for the user's benefit. The method ends in an end step 750, the mobile communication device having been automatically unlocked.

Although the present invention has been described in detail, those skilled in the pertinent art should understand that they can make various changes, substitutions and alterations herein without departing from the spirit and scope of the invention in its broadest form.

What is claimed is:

1. A mobile communication device, comprising:
a first body part;
a second body part;
a slider mechanism configured to slidably attach said second body part to said first body part, said second body part movable at least from a first position to a second position with respect to said first body part by means of said slider mechanism; and
a mechanical lock, including at least one lever acting as a stop, and configured to lock said second body part in said first position by positioning said lever perpendicular to said slider mechanism to prevent said second body part from moving along said slider mechanism, said mechanical lock comprising a user-operable mechanical switch coupled to said lever and positioned to cause said lever to either block or liberate said slider mechanism by moving said lever, while remaining perpendicular to said slider mechanism, in a perpendicular direction away from said slider mechanism, when said second body part and said user-operable mechanical switch are moved in said longitudinal direction.

2. The mobile communication device as recited in claim 1 wherein said mobile communication device is selected from the group consisting of:
a mobile telephone,
a PDA, and
an MDA.

3. The mobile communication device as recited in claim 1 wherein said lock further comprises a spring mechanism coupled to said lever.

4. The mobile communication device as recited in claim 1 wherein said user-operable mechanical switch is a micro-slider switch.

5. The mobile communication device as recited in claim 1 wherein said user-operable mechanical switch is configured to be operated with a given minimum force configured to prevent unintentional operation.

6. The mobile communication device as recited in claim 1 wherein said user-operable mechanical switch comprises at least two operating elements configured to alternative operation with a right hand or a left hand of a user.

7. The mobile communication device as recited in claim 6 wherein said at least two operating elements are located on opposite sides of said device.

8. The mobile communication device as recited in claim 1 wherein said lever is moved by manually moving said user-operable mechanical switch.

9. A method of automatically unlocking a mobile communication device having a first body part, a second body part, and a slider mechanism configured to slidably attach said second body part to said first body part, said method comprising:
detecting an incoming call; and
automatically moving a lever in a longitudinal direction parallel to said slider mechanism and in a perpendicular direction away from said slider mechanism in response to said detected incoming call to allow movement of said second body part from a first position to a second position with respect to said first body part by means of said slider mechanism, wherein said lever is perpendicularly positioned with respect to said slider mechanism to lock said second body part in said first position, and said lever remaining perpendicular to said slider mechanism during said automatically moving.

10. The method as recited in claim 9 wherein said mobile communication device is provided with a user-activatable function configured to disable at least part of said keys of said keypad, said method further comprising automatically interrupting disablement of said keypad in response to detecting said incoming call.

11. A mobile communication device, comprising:
a first body part;

a second body part;

a slider mechanism configured to slidably attach said second body part to said first body part, said second body part movable at least from a first position to a second position with respect to said first body part by means of said slider mechanism;

a lever positioned to lock said second body part in said first position to prevent said second body part from moving along said slider mechanism;

an electric motor coupled to said first body part or said second body part and configured to move said lever in a perpendicular direction from said slider mechanism to allow movement of said second body part along said slider mechanism;

a controller configured to control said electric motor; and a keypad configured to receive an input via a user of said mobile communication device and direct said motor through said controller to move said lever based on said input.

12. The mobile communication device as recited in claim 11 wherein said controller is configured to:
  detect an incoming call; and
  automatically move said lock in response to detecting said incoming call.

13. The mobile communication device as recited in claim 11 wherein said controller is configured to disable at least part of said keys of said keypad.

14. The mobile communication device as recited in claim 13 wherein said controller is configured to:
  detect an incoming call; and
  automatically interrupt disablement of said keypad in response to detecting said incoming call.

15. The mobile communication device as recited in claim 11 further comprising a second lever wherein said slider mechanism includes first and second slider rails, said motor positioned to move both of said levers to prevent said second body part from moving along said first and second slider rails.

* * * * *